(12) United States Patent
Sogabe et al.

(10) Patent No.: US 12,028,524 B2
(45) Date of Patent: Jul. 2, 2024

(54) SIGNAL RECONSTRUCTION METHOD, SIGNAL RECONSTRUCTION APPARATUS, AND PROGRAM

(71) Applicant: NIPPON TELEGRAPH AND TELEPHONE CORPORATION, Tokyo (JP)

(72) Inventors: Yoko Sogabe, Musashino (JP); Shiori Sugimoto, Musashino (JP); Takayuki Kurozumi, Musashino (JP); Hideaki Kimata, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/777,257

(22) PCT Filed: Nov. 26, 2019

(86) PCT No.: PCT/JP2019/046109
§ 371 (c)(1),
(2) Date: May 16, 2022

(87) PCT Pub. No.: WO2021/106062
PCT Pub. Date: Jun. 3, 2021

(65) Prior Publication Data
US 2022/0394266 A1    Dec. 8, 2022

(51) Int. Cl.
*H04N 19/126* (2014.01)
*H04N 19/127* (2014.01)
*H04N 19/44* (2014.01)

(52) U.S. Cl.
CPC ......... *H04N 19/126* (2014.11); *H04N 19/127* (2014.11); *H04N 19/45* (2014.11)

(58) Field of Classification Search
CPC .... H04N 19/126; H04N 19/127; H04N 19/45; H04N 19/85; G06T 5/00
(Continued)

(56) References Cited

U.S. PATENT DOCUMENTS

2006/0048038 A1* 3/2006 Yedidia ............. H03M 13/6312
714/793
2008/0306629 A1* 12/2008 Chiang .................... G07C 9/28
901/1
(Continued)

FOREIGN PATENT DOCUMENTS

| CN | 110266318 A | * | 9/2019 | ............. G06F 17/16 |
| DE | 102019209067 A1 | * | 1/2020 | ........... H04N 19/117 |
| WO | WO-2019050427 A1 | * | 3/2019 | ........... H04N 19/117 |

OTHER PUBLICATIONS

Singanallur V. Venkatakrishnan et al., Plug-and-Play Priors for Model Based Reconstruction, IEEE, Global Conference on Signal and Information Processing (GlobalSIP) 2013, Dec. 3, 2013.
(Continued)

*Primary Examiner* — Behrooz M Senfi
(74) *Attorney, Agent, or Firm* — Harness, Dickey & Pierce, P.L.C.

(57) ABSTRACT

Provided is a signal reconstruction method executed by a signal reconstruction apparatus including a processor and a memory that stores a codec. The signal reconstruction method includes reconstructing an input signal according to a desired purpose, and in the reconstructing, a likelihood of the input signal being a predetermined type of signal is considered by executing coding on a processing result of the input signal, based on the codec previously determined according to a type of the input signal.

4 Claims, 5 Drawing Sheets

(58) Field of Classification Search
USPC .................................................. 375/240.03
See application file for complete search history.

(56) References Cited

U.S. PATENT DOCUMENTS

| | | | |
|---|---|---|---|
| 2009/0217123 A1* | 8/2009 | Dore | H03M 13/1185 |
| | | | 714/790 |
| 2015/0125030 A1* | 5/2015 | Suzuki | A61B 5/441 |
| | | | 382/103 |
| 2020/0162751 A1* | 5/2020 | Kim | H04N 19/14 |

OTHER PUBLICATIONS

Takamichi Miyata and Makoto Nakashizuka, Image Priors for Image Reconstruction, Journal of the Institute of Image Information and Television Engineers, vol. 67, No. 8, 2013, pp. 661-665.
Yehuda Dar et al., Restoration by Compression, IEEE Transactions on Signal Processing, vol. 66, No. 22, 2018, pp. 5833-5847.

* cited by examiner

SIGNAL RECONSTRUCTION METHOD, SIGNAL RECONSTRUCTION APPARATUS, AND PROGRAM

CROSS-REFERENCE TO RELATED APPLICATIONS

This application is a 371 U.S. National Phase of International Application No. PCT/JP2019/046109, filed on Nov. 26, 2019. The entire disclosure of the above application is incorporated herein by reference.

TECHNICAL FIELD

The present disclosure relates to a signal reconstruction method, a signal reconstruction apparatus, and a program.

BACKGROUND ART

Observed signals such as images or audio may be reconstructed. Hereinafter, such an observed signal is referred to as an "observed signal". A signal acquired as a result of reconstruction is referred to as a "reconstructed signal". A matrix representing an observation process is referred to as an "observation process matrix".

Hereinafter, a symbol (for example,) indicated above a character in an equation and an expression is written immediately before the character. "^x" represents a reconstructed signal. "y" represents an observed signal (observation result). "A" represents an observation process matrix. Here, "(^x) ∈ $R^N$", "y ∈ $R^M$", and "A ∈ $R^{M \times N}$" are established, respectively. "M" and "N" are each any integer.

When linear observation is performed on an observed signal, the observed signal "y" and the observation process matrix "A" are expressed as in Equation (1).

[Math. 1]

$$y = A\hat{x} \qquad (1)$$

Here, if the observation process matrix "A" is singular (weak setting), it is not possible to uniquely derive the reconstructed signal "^x", based on the observed signal "y". For example, in the compressed sensing processing, "M<<N" is established, and therefore, the observation process matrix "A" is singular.

For example, in the processing of removing a blur in an image, if a reconstructed signal "^x" is an image with the blur removed, an observed signal "y" is a captured image (an image with the blur not removed), and the observation process matrix "A" is a "model representing the blur", the observation process matrix "A" is singular (weak setting). That is, although "M=N" is satisfied, the observation process matrix "A" is singular because the rank of the observation process matrix "A" drops.

For example, in the processing of generating a super-resolution image, if a reconstructed signal "^x" is a super-resolution image, an observed signal "y" is an input image (an image with low resolution), and an observation process matrix "A" is a "model representing degradation", the observation process matrix "A" is singular (weak setting). In other words, the observation process matrix "A" is singular because "M<<N" is established.

Thus, it is being examined to derive a solution to the problem of weak setting using a model (prior model) defined based on previously obtained knowledge (prior information) (see NPL 1 and NPL 2). In a solution to the problem of weak setting, the reconstructed signal "^x" is expressed as in Expression (2).

[Math. 2]

$$\hat{x} \leftarrow \operatorname*{argmin}_{x}\{l(y; x) + \beta s(x)\} \qquad (2)$$

Here, "l(y; x)" is a term for data fidelity. That is, "l(y; x)" is a term that defines the likelihood of observation of an observed signal "y" for an input signal "x". The data fidelity "l(y; x)" is, for example, defined as "$\|Ax-y\|_2^2$" by using a square error.

The model "s(x)" is a model (prior model) representing the previously obtained knowledge for the reconstructed signal. The term representing the model "s(x)" is a term that defines the likelihood of the reconstructed signal "Ax", the solution of Expression (2), being a predetermined type (data domain) of signal, and is a regularization term. For example, if a signal "x" is a signal of a natural image, the likelihood (likelihood of a natural image) of the reconstructed signal "^x" being a signal of a natural image is defined using the model "s(x)".

For example, in the model "s(x)", the likelihood of the reconstructed signal being a predetermined type of signal is defined using an index value of the sparsity of a discrete cosine transform (DCT) coefficient or an index value of total variation (TV) minimization. If the likelihood (likelihood of a natural image) of the reconstructed signal being a signal of a natural image is defined using an index value of the sparsity of a discrete cosine transform coefficient, a non-zero DCT coefficient reduces in an index value of the sparsity of the discrete cosine transform as the reconstructed signal appears more to be a natural image.

"β" is a weight parameter, and is a positive real number. The weight parameter "β" adjusts a balance of each term between an amount of distortion represented by the data fidelity "l(y; x)" and a code amount of the model "s(x)" in the regularization term.

In this way, the problem of weak setting indicated in Expression (2) results in an optimization problem in which the likelihood of a solution is defined using the regularization term, and a likelihood solution is derived within a range consistent with the observed signal (observation result). Thus, it is important how the model "s(x)" defines the likelihood of the solution.

In a case where the definition of the model "s(x)" is given, if the signal is an image, the model "s(x)" is defined by utilizing the fact that the image is smooth to employ, for example, an evaluation function that minimizes the L1 norm of a derivative value of a pixel value (TV minimization). For example, in sparse regularization, a model "s(x)" representing the number of non-zero coefficients in the result of executing "DCT/discrete wavelet transform (DWT) transformation" on the signal "x" may be defined.

In a case where the definition of the model "s(x)" is not given, the model "s(x)" is defined using, for example, "plug-and-play priors" described in NPL 1. In this case, if an apparatus (noise removal apparatus) for removing noise from the signal is prepared, it is possible for an apparatus (signal reconstruction apparatus) for reconstructing a signal to derive a solution to the optimization problem. In other words, the noise removal apparatus can implicitly define the model "s(x)".

If the noise removal apparatus is prepared, it is possible to define a complex model as compared with the model using the TV minimization and the sparse regularization. In other words, the signal can be reconstructed with at least a certain accuracy. If the noise removal apparatus is prepared, it may not be required to consider the signal characteristics.

CITATION LIST

Non Patent Literature

NPL 1: Singanallur V. Venkatakrishnan, Charles A. Bouman and Brendt Wohlberg, "Plug-and-Play Priors for Model Based Reconstruction", IEEE, Global Conference on Signal and Information Processing (GlobalSIP) 2013.

NPL 2: Takamichi Miyata, Makoto Nakashizuka, "Image Priors for Image Reconstruction", The journal of the Institute of Image Information and Television Engineers, Vol. 67, No. 8, pp. 661-665, 2013.

SUMMARY OF THE INVENTION

Technical Problem

The optimization problem is redefined as in Expression (3).

[Math. 3]

$$(\hat{u}, \hat{z}) \leftarrow \operatorname*{argmin}_{x,v}\{l(y; u) + \beta s(z)\} \qquad (3)$$

$$\text{subject to } u = z$$

The optimization problem of Expression (3) is redefined as the optimization problem of Expression (4), the optimization problem of Expression (5), and the substitution expression of Expression (6) by applying the alternating direction method of multipliers (ADMM) to Expression (3).

[Math. 4]

$$\hat{u}^{(k+1)} \leftarrow \operatorname*{argmin}_{u}\left[\|Ax - y\|_2^2 + \frac{\rho}{2}\|u - \tilde{u}^{(k)}\|_2^2\right] \qquad (4)$$

[Math. 5]

$$\hat{z}^{(k+1)} \leftarrow \operatorname*{argmin}_{z}\left\{\beta s(z) + \frac{\rho}{2}\|z - \tilde{z}^{(k)}\|_2^2\right\} \qquad (5)$$

[Math. 6]

$$d^{(k+1)} \leftarrow d^{(k)} + \left(\hat{u}^{(k)} - \hat{z}^{(k)}\right) \qquad (6)$$

The likelihood expressed by the solution of Expression (5) is the solution "$\hat{z}^{(k+1)}$" of the optimization problem that depends on the model "s(z)" based on the previously obtained knowledge, and is defined using the regularization term "$\beta s(z)$". Furthermore, Equations (7) and (8) are established.

[Math. 7]

$$\tilde{u}^{(k)} = \hat{z}^{(k)} - d^{(k)} \qquad (7)$$

[Math. 8]

$$\tilde{z}^{(k)} = \hat{u}^{(k)} + d^{(k)} \qquad (8)$$

Here "d" is an undefined Lagrange multiplier. "ρ" is a weight of a penalty term in the augmented Lagrangian method.

The solution of the optimization problem of Expression (4) depends on the observed signal "y" for the input signal "z" and the observation process matrix "A", and therefore, for example, can be derived by the Tikhonov regularization method, the conjugate gradient method, or the like.

The solution of the optimization problem of Expression (5) depends on the definition of the model "s(z)" based on the previously obtained knowledge (prior information). However, even if the definition of the model "s(z)" is given, there is a problem in that a complex model may not be defined by the TV minimization and the sparse regularization, and as a result, it is not possible to reconstruct the signal with at least a certain accuracy.

Even if the model "s(z)" is not directly defined, the solution of the optimization problem of Expression (5) can be derived according to Equation (9) by using a function (a denoising function) "D(z)" for removing noise from a signal in the "plug-and-play priors" described in NPL 1.

[Math. 9]

$$\hat{z}^{(k+1)} = D(\tilde{u}^{(k)}) \qquad (9)$$

The function "D(z)" is, for example, a function of block matching and 3D collaborative filtering (BM3D). In order for Expression (5) to be solved using the denoising function, it is not necessary for "s(z)" itself to be directly defined. Furthermore, because a highly accurate model "s(z)" internally possessed by an excellent function "D(z)" for removing noise is available, the signal can be reconstructed with at least a certain accuracy. However, the process of removing noise may require a large amount of calculation. Thus, in a case where the definition of the model "s(z)" is not given, there is a problem that the signal cannot be reconstructed with at least a certain accuracy unless a noise removal apparatus is used.

In view of the above circumstances, an object of the present disclosure is to provide a signal reconstruction method, a signal reconstruction apparatus, and a program, capable of reconstructing a signal with at least a certain accuracy without using a noise removal apparatus.

Means for Solving the Problem

An aspect of the present disclosure is a signal reconstruction method executed by a signal reconstruction apparatus including a processor and a memory that stores a codec, the signal reconstruction method includes reconstructing an input signal according to a desired purpose, and in the reconstructing, a likelihood of the input signal being a predetermined type of signal is considered by executing coding on a processing result of the input signal, based on the codec previously determined according to a type of the input signal.

An aspect of the present disclosure is a signal reconstruction apparatus including a processor that reconstructs an input signal according to a desired purpose and a memory that stores a codec, and the processor considers a likelihood of the input signal being a predetermined type of signal by executing coding on a processing result of the input signal, based on the codec previously determined according to a type of the input signal.

An aspect of the present disclosure is a program for causing a computer to operate as the signal reconstruction apparatus for executing the signal reconstruction method described above.

Effects of the Invention

According to the present disclosure, it is possible to reconstruct a signal with at least a certain accuracy without using a noise removal apparatus.

DESCRIPTION OF EMBODIMENTS

An embodiment of the present disclosure will be described in detail with reference to the drawings.

Figure 1:
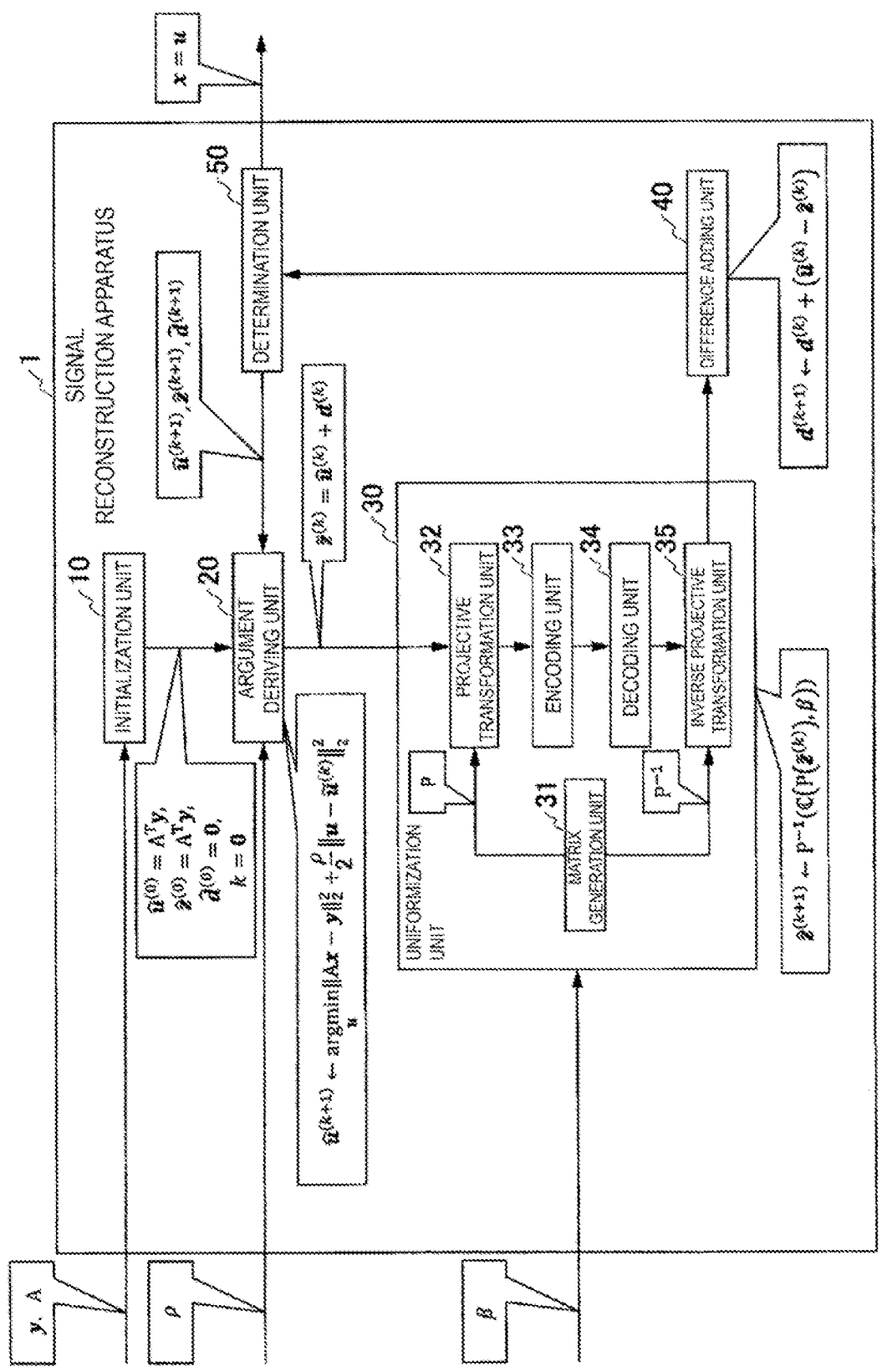
FIG. 1 is a diagram illustrating an example of a configuration of a signal reconstruction apparatus according to an embodiment.

FIG. 1 is a diagram illustrating an example of a configuration of a signal reconstruction apparatus 1. The signal reconstruction apparatus 1 is an apparatus for reconstructing an input signal according to a desired purpose. The signal reconstruction apparatus 1 includes an initialization unit 10, an argument deriving unit 20, a uniformization unit 30, a difference adding unit 40, and a determination unit 50. The uniformization unit 30 includes a matrix generation unit 31, a projective transformation unit 32, an encoding unit 33, a decoding unit 34, and an inverse projective transformation unit 35.

Figure 2:
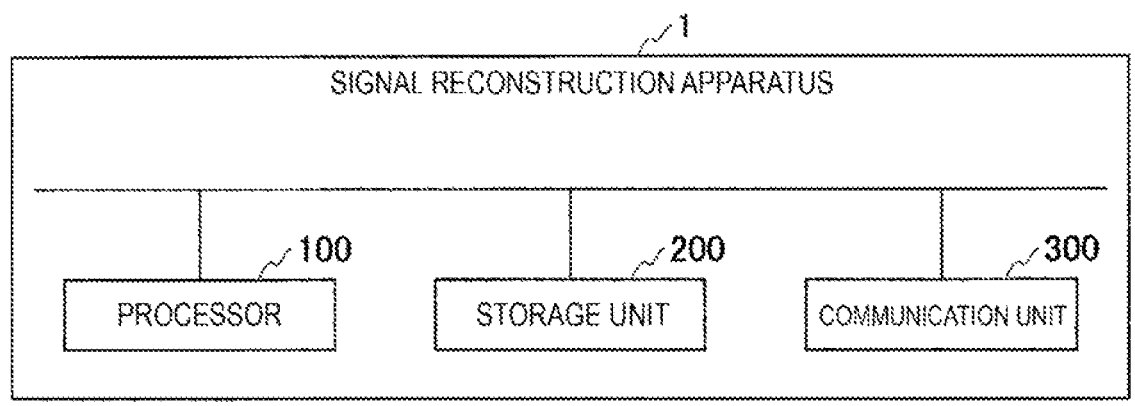
FIG. 2 is a diagram illustrating an example of a hardware configuration of the signal reconstruction apparatus according to the embodiment.

FIG. 2 is a diagram illustrating an example of a hardware configuration of the signal reconstruction apparatus 1. The signal reconstruction apparatus 1 includes a processor 100, a storage unit 200, and a communication unit 300 as a hardware configuration.

The processor 100 such as a central processing unit (CPU) executes a program stored in the storage unit 200 having a nonvolatile recording medium (non-transitory recording medium), and thus, some or all of the initialization unit 10, the argument deriving unit 20, the uniformization unit 30, the difference adding unit 40, and the determination unit 50 are implemented as software. The program may be recorded on a computer-readable recording medium. The computer-readable recording medium is, for example, a non-transitory recording medium such as a portable medium such as a flexible disk, an optical magnetic disk, a read only memory (ROM), or a compact disc read only memory (CD-ROM), and the storage device such as a hard disk built into a computer system. The program may be received by the communication unit 300 via a communication line. The storage unit 200 stores, for example, an input signal, a program, a parameter, and a data table. The input signal is a signal of a type (data domain) such as a moving image, a still image, audio, a three-dimensional image, or a point cloud.

Some or all of the initialization unit 10, the argument deriving unit 20, the uniformization unit 30, the difference adding unit 40, and the determination unit 50 may be implemented by using, for example, hardware including an electronic circuit (or circuitry) using a large scale integration circuit (LSI), an application specific integrated circuit (ASIC), a programmable logic apparatus (PLD), a field programmable gate array (FPGA), or the like.

Returning to FIG. 1, the description for an example of the configuration of the signal reconstruction apparatus 1 will be continued.

The initialization unit 10 acquires an observed signal "y" and an observation process matrix "A" from an external apparatus (not illustrated). The initialization unit 10 initializes an initial value "^u$^{(0)}$" of the solution of the optimization problem indicated in Expression (4) to "A$^T$y". "T" represents transposition. The observed signal "y" is, for example, an image signal. The initialization unit 10 initializes an initial value "^z$^{(0)}$" of a variable representing a result of inverse projective transformation to "A$^T$y". The initialization unit 10 initializes an undefined Lagrange multiplier "d$^{(0)}$" to 0. The initialization unit 10 initializes a variable "k" representing the number of times the encoding is executed to 0.

The initialization unit 10 outputs, to the argument deriving unit 20, the initial value "^u$^{(0)}$" of the solution of the optimization problem indicated in Expression (4), the initial value "^z$^{(0)}$" of the variable representing the result of the inverse projective transformation, the undefined Lagrange multiplier "d$^{(0)}$", and the variable "k=0" of a counter.

The argument deriving unit 20 acquires, from the initialization unit 10, the initial value "^u$^{(0)}$" of the solution of the optimization problem indicated in Expression (4), the initial value "^z$^{(0)}$" of the variable representing the result of the inverse projective transformation, the undefined Lagrange multiplier "d$^{(0)}$", and the variable "k=0" representing the number of times the encoding is executed, as the initial value of each variable.

If the determination unit 50 determines that the solution of any of Expression (4), Expression (6), and Expression (11) is not converged, the argument deriving unit 20 acquires, from the determination unit 50, an updated solution "^u$^{(k+1)}$" of the optimization problem indicated in Expression (4), an updated variable "^z$^{(k+1)}$" representing the result of the inverse projective transformation, an updated undefined Lagrange multiplier "d$^{(k+1)}$", and the variable "k" representing the number of times the encoding is executed.

The argument deriving unit 20 derives the arguments of the minimization function "min $\{\|Ax-y\|_2^2+(\rho/2)\|u-\sim u^{(k)}\|_2^2\}$" indicated in Expression (4). In other words, the argument deriving unit 20 derives a solution of Expression (4). The method by which the argument deriving unit 20 derives the solution of Expression (4) is not limited to a certain method. For example, the argument deriving unit 20 derives a solution as in Equation (10) by a matrix operation based on the Tikhonov regularization method.

[Math. 10]

$$\hat{u}^{(k+1)} = (2A^T A + \rho I)^{-1}(2A^T y + \rho \tilde{u}^{(k)}) \qquad (10)$$

The argument deriving unit 20 derives "$\sim z^{(k)}$" used in Expression (5), based on Equation (7), Equation (8), and the solution "^u$^{(k+1)}$" of Equation (10). The argument deriving unit 20 outputs the derived "$\sim z^{(k)}$" to the uniformization unit 30.

If the signal reconstruction apparatus 1 does not include the uniformization unit 30, the reconstructed signal becomes a reconstructed signal which has a low likelihood of the reconstructed signal being a predetermined type of signal even if the reconstructed signal has a high data fidelity "$\|Ax-y\|_2^2$" with the observed signal. For example, if the input signal is a natural image signal, the reconstructed signal becomes a reconstructed signal which has a high fidelity with the observed signal, but is a reconstructed signal not appearing to be a natural image. The resulting reconstructed signal is based on the fidelity (in other words, the consistency between the observed signal and the reconstructed signal), as described above. This reconstructed signal is simply a reconstructed signal in which the error between the reconstructed signal and the observed signal is small. However, there is no guarantee that the image of the reconstructed signal appears to be a natural image.

Thus, instead of the noise removal apparatus deriving the solution of Expression (5) as in Equation (9), the uniformization unit 30 uses the codec "C" to derive the solution of Expression (5) as in Expression (11). As a result, if there are prepared an encoding apparatus for executing excellent compression encoding corresponding to a data domain of the input signal (for example, a moving image, a still image, audio, a three-dimensional image, or a point cloud) and a decoding apparatus, the signal can be reconstructed with at least a certain accuracy. Here, it can be expected that a code amount of an image having image-like characteristics is small. That is, it can be expected that the expressivity of an image having image-like characteristics is high in the encoding apparatus. A resource such as a hardware encoder may be utilized by the signal reconstruction apparatus 1, and thus, the signal reconstruction apparatus 1 can speed up processing. Further, the codec has been developed with an emphasis on subjective quality, and thus, the signal reconstruction apparatus 1 can generate a reconstructed image having excellent subjective quality.

[Math. 11]

$$\hat{z}^{(k+1)} \leftarrow \mathbb{C}(\tilde{z}^{(k)}, \beta) \quad (11)$$

Here, for example, the solution "$\hat{z}^{(k+1)}$" of Expression (11) using the codec "C" for compressing the image data is an image having a small code amount, and an image with a small square error. Note that "$\beta$" means a balance between the code amount and the square error. As the "$\beta$" increases, the small code amount is more important. The code amount of "$\hat{z}^{(k+1)}$" is smaller as the solution of Expression (11) has more image signal-like characteristics, and therefore, the image is converted into an image appearing more to be the image signal by Expression (11). The uniformization unit 30 outputs, to the difference adding unit 40, the solution of Expression (4) derived by the argument deriving unit 20, the solution of Expression (11), and the undefined Lagrange multiplier.

The difference adding unit 40 acquires, from the uniformization unit 30, the solution of Expression (4), the solution of Expression (11), and the undefined Lagrange multiplier. The difference adding unit 40 updates the undefined Lagrange multiplier as in Expression (6). That is, the solution of Expression (6) is derived by adding the undefined Lagrange multiplier to the difference between the solution of Expression (4) and the solution of Expression (11). The difference adding unit 40 outputs, to the determination unit 50, each solution of Expression (4), Expression (6), and Expression (11).

The determination unit 50 acquires each solution of Expression (4), Expression (6), and Expression (11) from the difference adding unit 40. The determination unit 50 determines whether all of the solutions of Expression (4), Expression (6), and Expression (11) are converged.

If it is determined that the solution of any of Expression (4), Expression (6), and Expression (11) is not converged, the determination unit 50 outputs, to the argument deriving unit 20, an updated solution "$\hat{u}^{(k+1)}$" of the optimization problem indicated in Expression (4), an updated variable "$\hat{z}^{(k+1)}$" representing the result of the inverse projective transformation, an updated undefined Lagrange multiplier "$d^{(k+1)}$", and the variable "k" representing the number of times the encoding is executed.

If it is determined that all of the solutions of Expression (4), Expression (6), and Expression (11) are converged, the determination unit 50 outputs the reconstructed signal "x=u" to an external apparatus (not illustrated).

Figure 3:
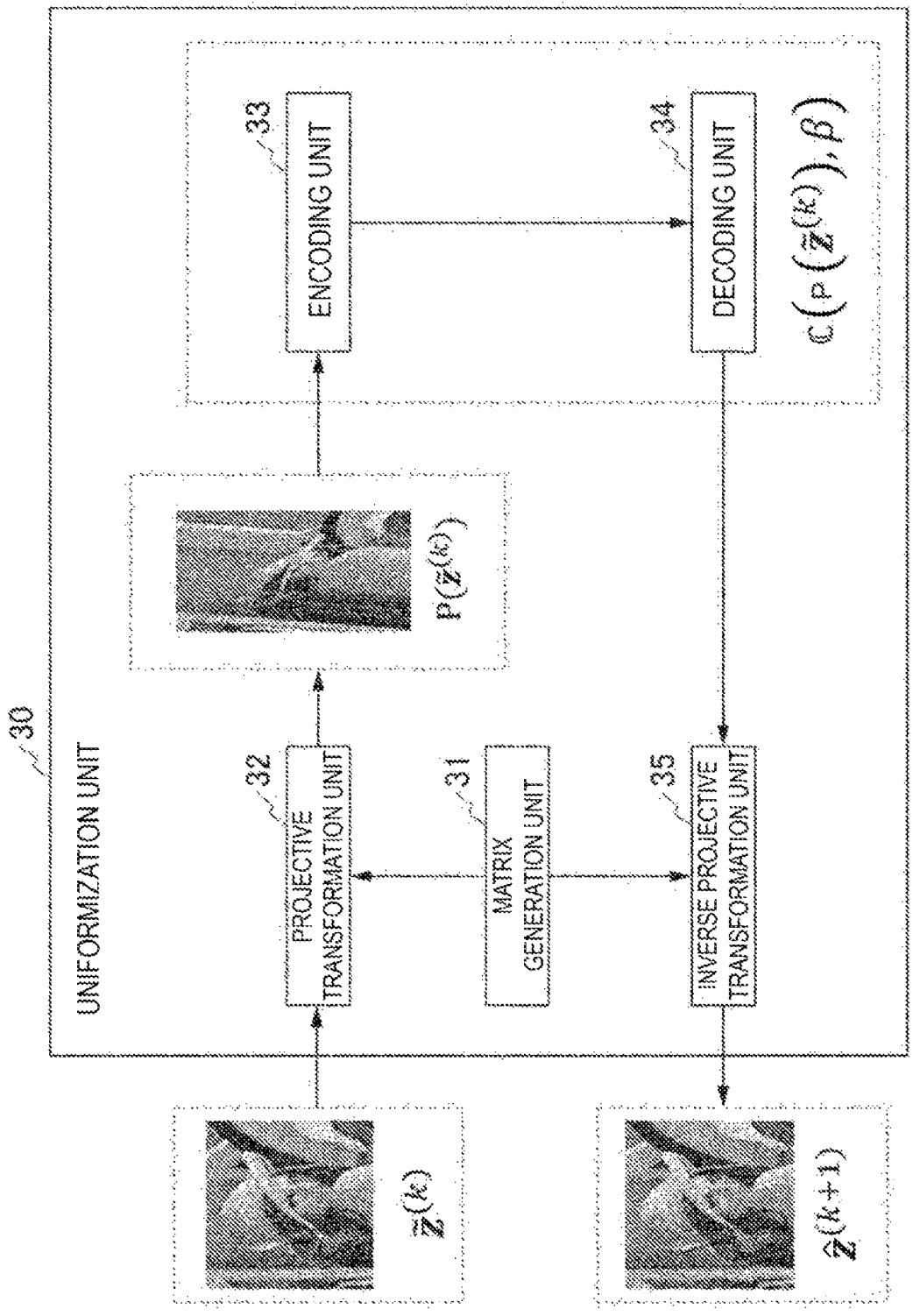
FIG. 3 is a diagram illustrating an example of a configuration of a uniformization unit according to the embodiment.

Next, the details of the uniformization unit 30 will be described. FIG. 3 is a diagram illustrating an example of a configuration of the uniformization unit 30. The matrix generation unit 31 randomly generates a projection matrix "P" and an inverse projection matrix "$P^{-1}$" for each repetition of a distortion (hereinafter, referred to as the "encoding distortion") that occurs in the signal in response to the encoding processing.

The matrix generation unit 31 uses the projection matrix "P" and the inverse projection matrix "$P^{-1}$" to reduce the bias in the position and direction of the encoding distortion. That is, the uniformization unit 30 uses the projection matrix "P" and the inverse projection matrix "$P^{-1}$" to uniformize the influence of the encoding distortion in the reconstructed signal. In other words, the uniformization unit 30 disperses the encoding distortion so that the density of the encoding distortion due to coding does not increase in a certain region of the reconstructed signal.

The position of the encoding distortion is, for example, near a boundary of encoding blocks (for example, macroblocks of 8×8 pixels) adjacent to each other when the input signal is an image signal. The direction in which the encoding distortion occurs repeatedly is, for example, a direction in which the encoding blocks are lined up in a frame of the image, a direction of a base set, and a direction of motion estimation, when the input signal is an image signal.

The projective transformation unit 32 acquires, from the matrix generation unit 31, a projection matrix "P" randomly generated for each repetition of the encoding distortion. The projective transformation unit 32 acquires the derived "$\tilde{z}^{(k)}$" from the argument deriving unit 20. That is, the projective transformation unit 32 acquires the regularization processing for the input signal "z" from the argument deriving unit 20.

The projective transformation unit 32 executes projective transformation (transform) on the processing result "$\tilde{z}^{(k)}$" of the input signal "z", by using the projection matrix "P". The projective transformation unit 32 outputs, to the encoding unit 33, the signal "$P(\tilde{z}^{(k)})$" on which the projective transformation is executed.

The encoding unit 33 acquires, from the projective transformation unit 32, the signal "$P(\tilde{z}^{(k)})$" on which the projective transformation is executed. The encoding unit 33 executes coding on the signal "$P(\tilde{z}^{(k)})$" on which the projective transformation is executed, by using the codec "C" previously determined according to the type of input signal. That is, the encoding unit 33 encodes the signal "$P(\tilde{z}^{(k)})$" on which the projective transformation is executed, by using the previously determined codec "C".

The codec "C" is not limited to a certain codec as long as it is a codec corresponding to the type of input signal. For example, if the input signal is an image signal, the encoding unit 33 may use any codec including the joint photographic experts group (JPEG), high efficiency image file format (HEIF), high efficiency video coding (HEVC) intra, or WebP (VP8 intra) to execute encoding.

The decoding unit 34 acquires, from the encoding unit 33, the result of the encoding of the signal "$P(\tilde{z}^{(k)})$" on which the projective transformation is executed. The decoding unit 34 decodes the encoding result by using the codec "C". The decoding unit 34 outputs, to the inverse projective transformation unit 35, the result "C(P(~z$^{(k)}$), β)" obtained by decoding the encoding result.

The inverse projective transformation unit 35 acquires, from the matrix generation unit 31, an inverse projection matrix "P$^{-1}$" generated for each repetition of the encoding distortion. The inverse projective transformation unit 35 executes inverse projective transformation (inverse transform) as in Expression (12) on the decoding result "C(P(~z$^{(k)}$), β)".

[Math. 12]

$$\hat{z}^{(k+1)} \leftarrow p^{-1}(\mathbb{C}(\hat{z}^{(k)}), \beta)) \quad (12)$$

The inverse projective transformation unit 35 outputs, to the difference adding unit 40, the signal "P$^{-1}$(C(P(~z$^{(k)}$), β))" on which the inverse projective transformation is executed, as an updated variable "^z$^{(k+1)}$" representing the result of the inverse projective transformation.

Next, an example of an operation of the signal reconstruction apparatus 1 will be described.

Figure 4:
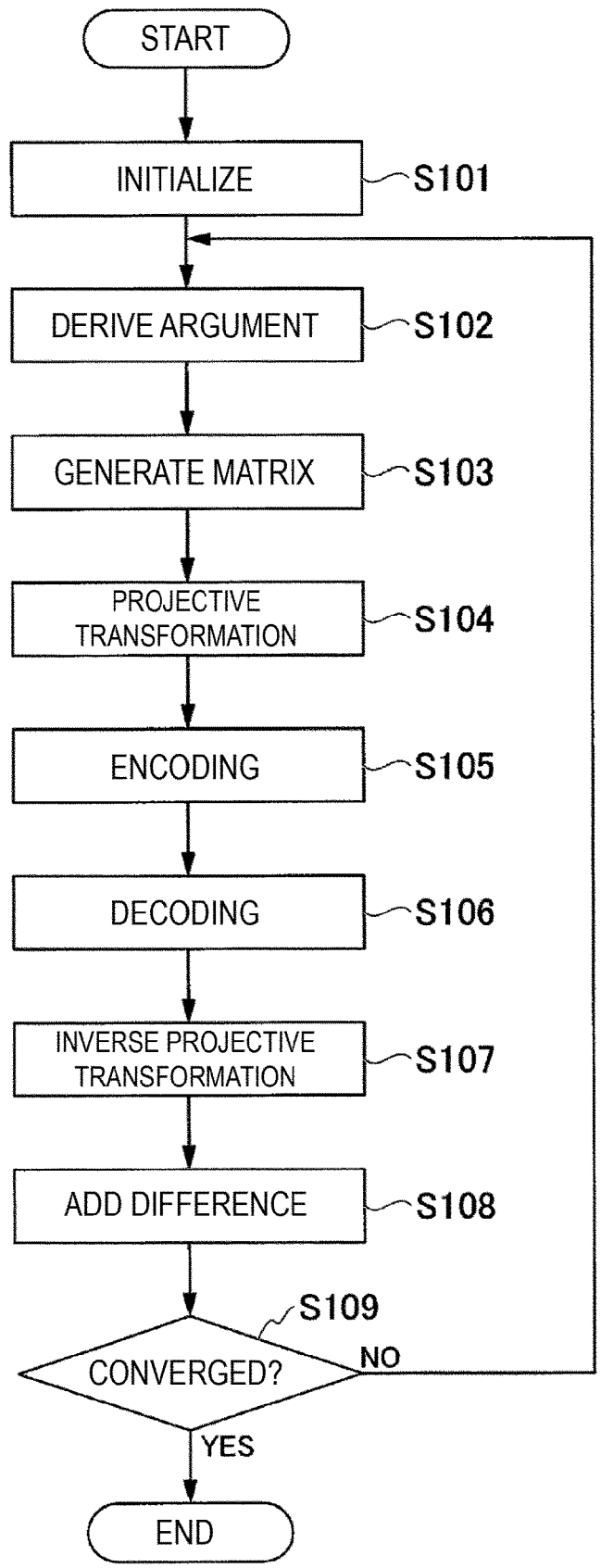
FIG. 4 is a flowchart illustrating an example of an operation of the signal reconstruction apparatus according to the embodiment.

FIG. 4 is a flowchart illustrating an example of an operation of the signal reconstruction apparatus 1.

The initialization unit 10 initializes the initial value "^u$^{(0)}$" to "A$^T$y". The initialization unit 10 initializes the initial value "^z$^{(0)}$" to "A$^T$y". The initialization unit 10 initializes the undefined Lagrange multiplier "d$^{(0)}$" to 0. The initialization unit 10 initializes the variable "k" representing the number of times the encoding is executed to 0 (step S101). The argument deriving unit 20 derives the arguments of the minimization function "min" indicated in Expression (4) (step S102).

The matrix generation unit 31 randomly generates a projection matrix and an inverse projection matrix for each repetition of the encoding distortion (step S103). The projective transformation unit 32 executes projective transformation on the processing result "~z$^{(k)}$" of the input signal "z", by using the projection matrix "P" (step S104). The encoding unit 33 executes encoding on the signal "P(~z$^{(k)}$)" on which the projective transformation is executed, by using the codec "C" (step S105). The decoding unit 34 outputs, to the inverse projective transformation unit 35, the result "C(P(~z$^{(k)}$), β)" obtained by decoding the encoding result (step S106). The inverse projective transformation unit 35 executes inverse projective transformation on the decoding result "C(P(~z$^{(k)}$), β)", by using the inverse projection matrix "P$^{-1}$" (step S107).

The difference adding unit 40 updates the undefined Lagrange multiplier by adding the undefined Lagrange multiplier to the difference between the solution of Expression (4) and the solution of Expression (11) (step S108). The determination unit 50 determines whether all of the solutions of Expression (4), Expression (6), and Expression (11) are converged (step S109).

If it is determined that the solution of any of Expression (4), Expression (6), and Expression (11) is not converged (No in step S109), the determination unit 50 outputs, to the argument deriving unit 20, a variable "^u$^{(k+1)}$", a variable "^z$^{(k+1)}$", the undefined Lagrange multiplier "d$^{(k+1)}$", and the variable "k". The determination unit 50 returns the processing to step S102.

If it is determined that all of the solutions of Expression (4), Expression (6), and Expression (11) are converged (YES in step S109), the determination unit 50 outputs the reconstructed signal "x=u" to an external apparatus (not illustrated).

As described above, the processor 100 in the signal reconstruction apparatus 1 considers the likelihood of the input signal being a predetermined type of signal by executing coding on the processing result of the input signal "z", based on the codec "C" previously determined according to the type of the input signal "z". The processing result of the input signal "z" is a solution of the optimization problem of Expression (4) that depends on the observation result (observed signal) "y" of the input signal and the observation process (observation process matrix "A").

In this way, the processor 100 executes coding, as in Expression (11) or Expression (12), on the processing result "~z$^{(k)}$" of the input signal based on Expression (4) and Equation (8) to define the likelihood as in Expression (5). As a result, it is possible to reconstruct a signal with at least a certain accuracy without using a noise removal apparatus.

Note that because only the coding is executed as in Expression (11) or Expression (12), the present disclosure is applicable even if the definition of the model "s(z)" based on the previously obtained knowledge (prior information) is not given. In addition, unlike the "end-to-end" image reconstruction method using a convolutional neural network, model learning is not required, and thus, a large amount of high-quality data is not required.

Next, an example of reconstructed image is illustrated as an example of a reconstructed signal.

Figure 5:
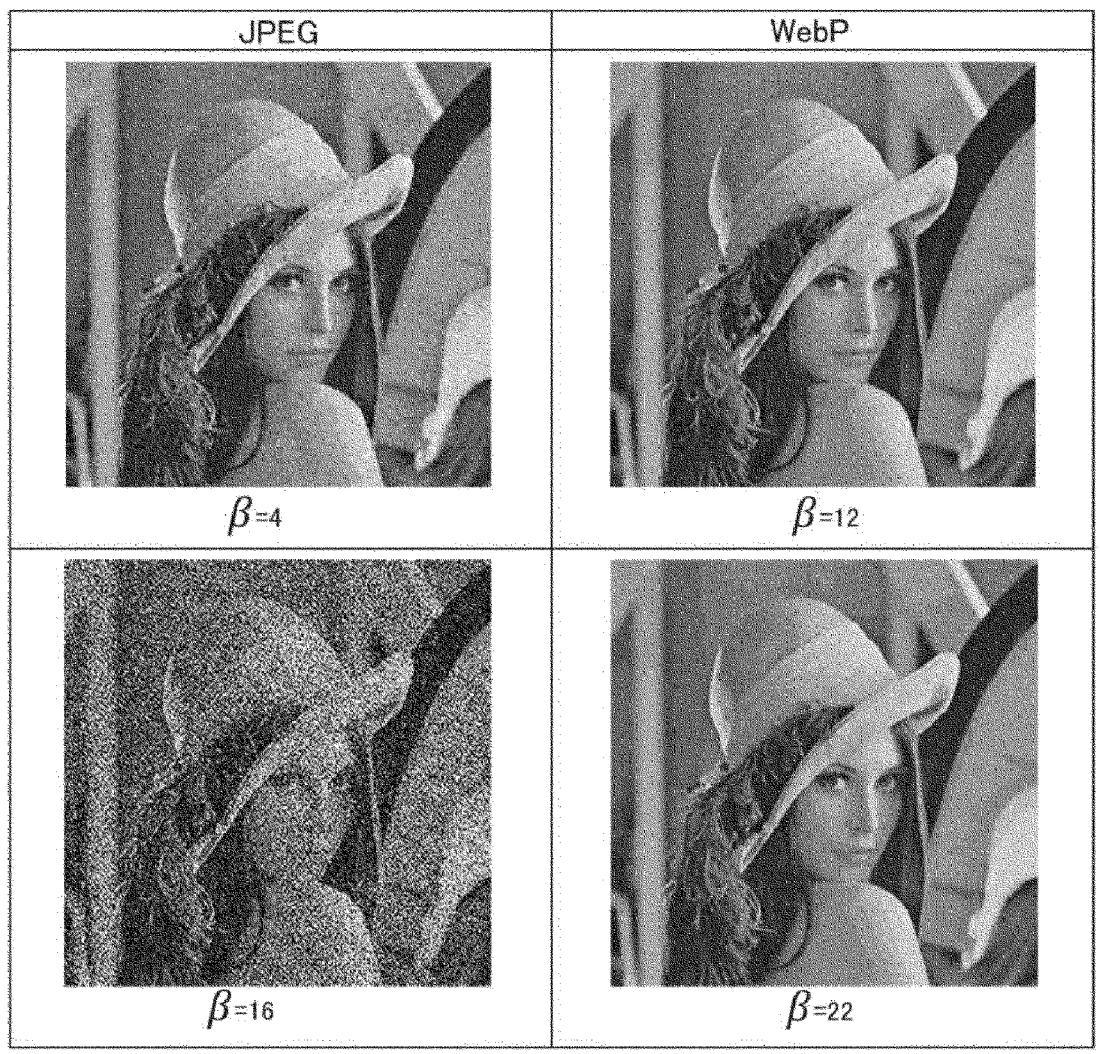
FIG. 5 is a diagram illustrating an example of reconstructed images according to the embodiment.

FIG. 5 is a diagram illustrating an example of reconstructed images. The reconstructed images illustrated in FIG. 5 include images regularized using JPEG and images regularized using WebP. The weight parameter "β" is 4, 12, 16, and 22. In FIG. 5, when the weight parameter "β" is 4, it is possible to reconstruct the signal of each image with at least a certain accuracy by using JPEG.

The compression rate of encoding using WebP is higher than the compression rate of encoding using JPEG. As illustrated in FIG. 5, as the codec has a higher compression rate, it is possible to reconstruct the signal of each image with at least a certain accuracy.

Although the embodiment of the present disclosure has been described in detail with reference to the drawings, a specific configuration is not limited to the embodiment, and a design or the like in a range that does not depart from the gist of the present disclosure is included.

INDUSTRIAL APPLICABILITY

The present disclosure is applicable to an apparatus for reconstructing a signal such as a moving image, a still image, audio, a three-dimensional image, a point cloud, or the like.

REFERENCE SIGNS LIST

1 . . . Signal reconstruction apparatus
10 . . . Initialization unit
20 . . . Argument deriving unit
30 . . . Uniformization unit
31 . . . Matrix generation unit
32 . . . Projective transformation unit
33 . . . Encoding unit
34 . . . Decoding unit
35 . . . Inverse projective transformation unit
40 . . . Difference adding unit
50 . . . Determination unit
100 . . . Processor
200 . . . Storage unit
300 . . . Communication unit

The invention claimed is:

1. A signal reconstruction method executed by a signal reconstruction apparatus including a processor and a memory configured to store a codec, the signal reconstruction method, comprising:
   receiving an input data signal of a predetermined type; and
   generating a reconstructed data signal by:
   determining a processing result from the input data signal using a model representing previously obtained knowledge of the reconstructed data signal;
   executing a random transformation on the processing result of the input data signal;
   executing coding on the processing result of the input data signal based on the codec previously determined according to a type of the input data signal, the coding is executed on a processing result of the input signal upon which the random transformation is executed; and
   executing an inverse transformation of a processing result of the input data signal upon which the coding is executed.

2. The signal reconstruction method according to claim 1, wherein in the reconstructing, an encoding distortion is dispersed to prevent a density of the encoding distortion due to the coding from increasing in a particular region of the input signal.

3. A signal reconstruction apparatus, comprising:
   a processor configured to reconstruct an input data signal; and
   a memory configured to store a codec, wherein the input data signal is reconstructed by
   determining a processing result from the input data signal using a model representing previously obtained knowledge of the reconstructed data signal;
   executing a random transformation on the processing result of the input data signal;
   executing coding on the processing result of the input data signal based on the codec previously determined according to a type of the input data signal, the coding is executed on a processing result of the input signal upon which the random transformation is executed; and
   executing an inverse transformation of a processing result of the input data signal upon which the coding is executed.

4. A non-transitory computer-readable medium having computer-executable instructions that, upon execution of the instructions by a processor of a computer, cause the computer to function as the signal reconstruction method according to claim 1.

* * * * *